(No Model.) 2 Sheets—Sheet 1.
M. KANE.
HARVESTER.
No. 392,807. Patented Nov. 13, 1888.
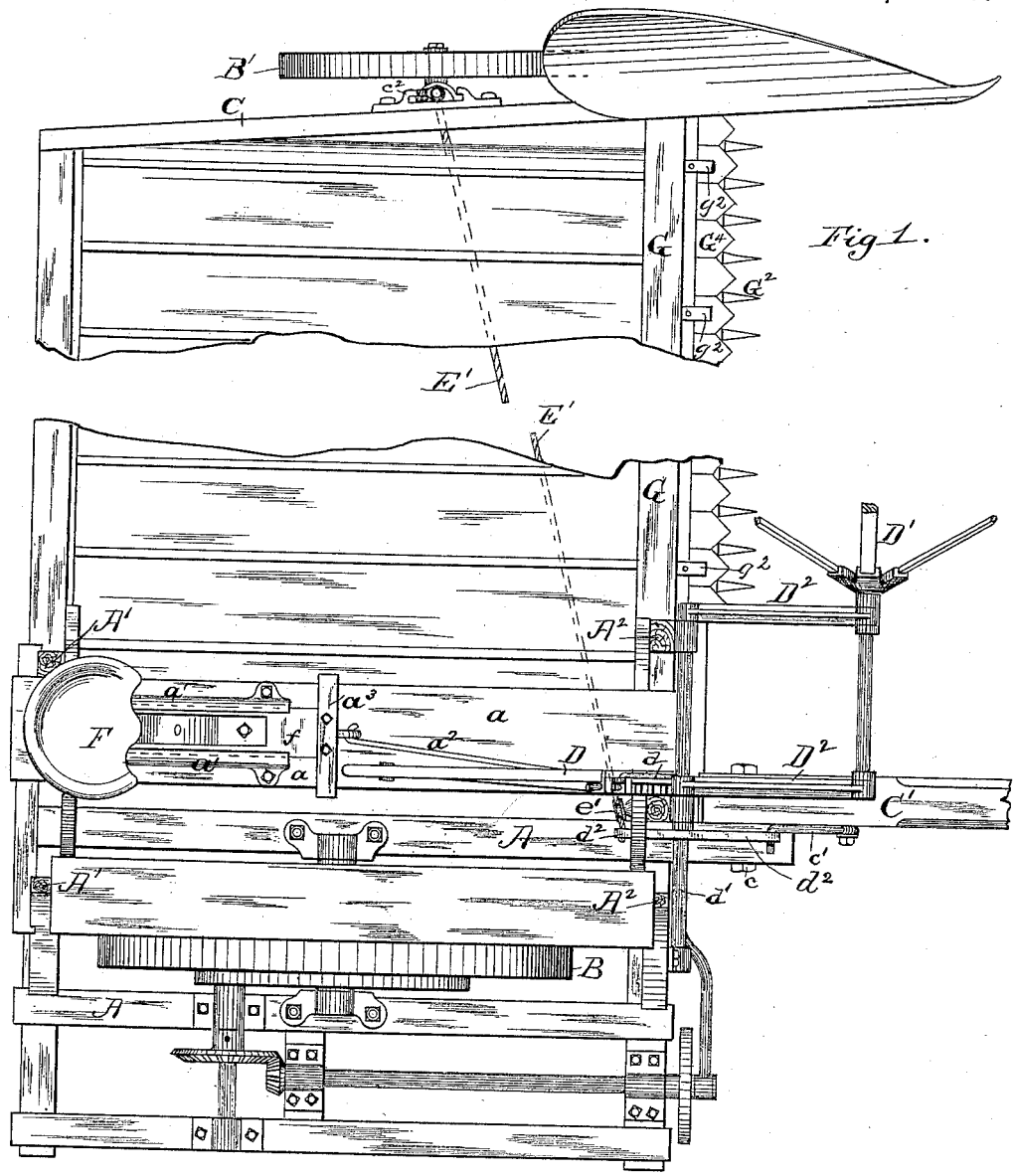
Witnesses:
Lew. E. Curtis.
T. E. Williams
Inventor:
Maurice Kane,
By Taylor E. Brown
his atty.

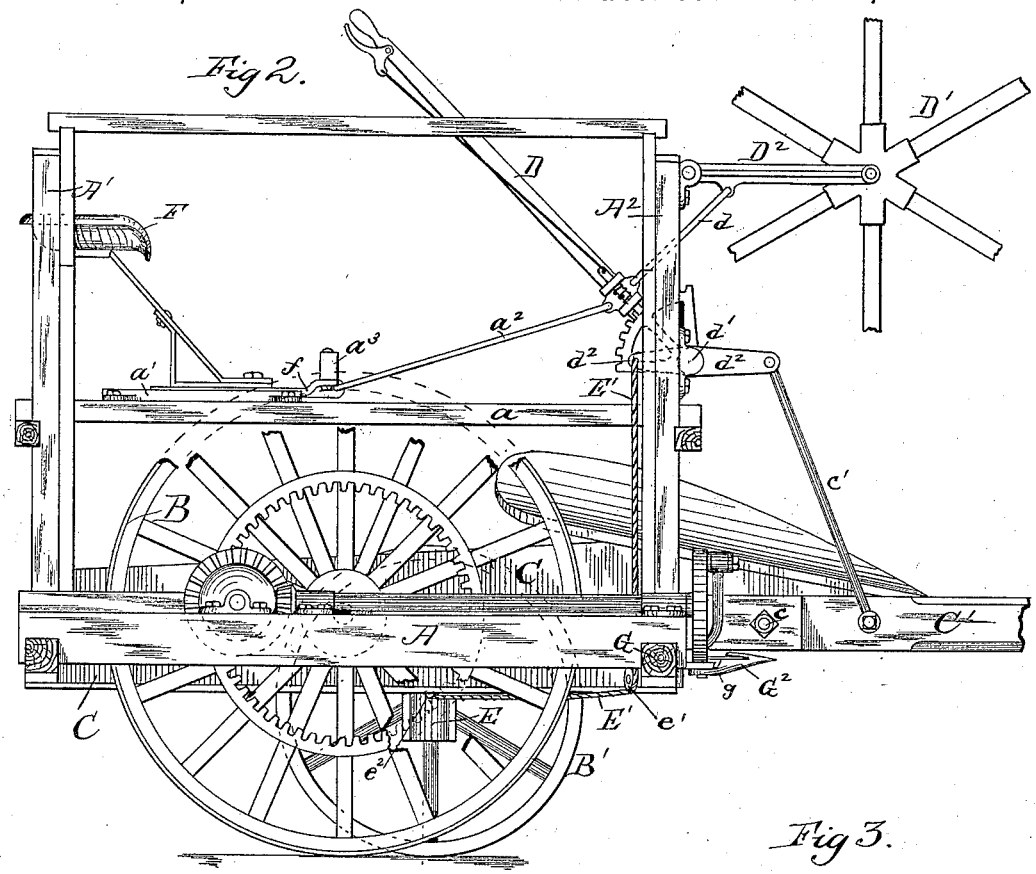

UNITED STATES PATENT OFFICE.

MAURICE KANE, OF CHICAGO, ILLINOIS.

HARVESTER.

SPECIFICATION forming part of Letters Patent No. 392,807, dated November 13, 1888.

Application filed June 9, 1885. Serial No. 168,170. (No model.)

*To all whom it may concern:*

Be it known that I, MAURICE KANE, a citizen of the United States, residing at Chicago, in the county of Cook and State of Illinois, have invented certain new and useful Improvements in Harvesters; and I do hereby declare that the following is such a full, clear, and exact description of the invention as will enable others skilled in the art to which it appertains to make and use the same, reference being had to the accompanying drawings, which form a part thereof.

In machines now in use, wherein the frame is not lowered or raised on the main wheel, it is customary, in order to lower the sickle-bar to cut grain at different heights, to pivot the frame and the tongue or pole together forward of or near the sickle-bar, and, by means of a lever-connection, depress or lower the sickle-bar, the frame of the machine turning on the axle of the main wheel as a center. In these machines the grain-wheel axle is usually placed slightly in advance of the main-wheel axle, and when this tilting or lowering of the sickle-bar takes place the sickle-bar is found to be on an incline, the main-wheel end being proportionally as much closer to the ground than the grain-wheel end as the arc described by the main-wheel end is greater than the arc described by the grain-wheel end, owing to the fact that the latter wheel is in advance of the former or main wheel.

The difficulty above pointed out is well known to all harvester men, and one of the objects of my invention is to overcome the same. Another part of the invention is the means employed for automatically securing the grain-wheel to the frame of the harvester when the grain-wheel side of the frame is lifted from the ground.

In the drawings, wherein similar letters of reference indicate like parts wherever used, I have shown in Figure 1 a plan view of the frame-work of an ordinary harvester with my improvements applied thereto; in Fig. 2, a side elevation of the same; in Fig. 3, a side view of the dividing-board and grain-wheel slide-plate enlarged; and in Fig. 4 a sectional view of the sickle-bar.

In the drawings, the letter A represents the frame of the harvester, provided with the usual standards, $A'$ $A^2$, and seat-board $a$.

B is the main wheel, and $B'$ the grain-wheel; C, the dividing-board, and $C'$ the tongue. The tongue is pivoted by pivot $c$ to the frame A, and is provided with the usual crank-rod or link connection, $c'$, to the arm $d^2$ of the lever D, whereby the sickle-bar is raised and lowered.

$D'$ is the reel suspended from the arms $D^2$, which are pivoted to the standards $A^2$. A link or rod, $d$, connects one of the arms $D^2$ to the lever D, thus causing the reel to travel a greater distance than the sickle-bar when the latter is lowered or raised by a movement of the lever D.

On the outer side of the dividing-board C are secured guides $c^2$, which form a guideway for the sliding plate E. The grain-wheel axle is revolubly secured in a bearing in said plate E, so as to revolve freely therein and at the same time partake of the vertical or sliding movement of said plate. One of said guides is provided with ratchet-teeth $c^3$ to engage the pawl $e$, pivoted to the sliding plate E. The lever-shaft $d'$ is provided with a crank-arm, $d^3$, and a cable or cord, $E'$, passes from this arm $d^2$ under the pulleys $e'$ $e^2$, located on the lower side of the frame, to the pawl $e$. The weight of the outer end of the machine rests on the cable $E'$ and keeps it taut, and also holds the pawl out of engagement with the ratchet-teeth. When it is desired to lower the sickle-bar, the operator simply slackens the cable by means of the lever D, as shown, when the weight of the machine will cause the dividing-board to lower or slip down the plate E at the same time that the other end of the machine is rocked on the main-wheel axle and the sickle-bar lowered, by means of the rod $c'$ and pivot $c$, thus always maintaining the grain-wheel end of the sickle-bar the same height from the ground as the main-wheel end. The sickle-bar is raised by simply moving the lever D, causing a strain on the cable, which tends to pull down on the sliding plate E, and thereby, by means of the pulley $e^2$, the dividing-board is raised on the plate E.

The weight at the dividing-board should always be sufficient to keep the cable taut and always have a tendency to cause said board to slide down on the plate E, and to prevent the tendency of the dividing-board from rising when harvesting on uneven ground or hillside, I have provided the pawl $e$ and the spring $e^3$, as shown, so that when the cable is slackened from any cause the spring $e^3$ will force said pawl $e$ into engagement with the teeth $c^3$ and prevent the dividing-board from rising without carrying the grain-wheel up with it.

F is the seat secured to the sliding head $f$. The seat-board or table $a$ is provided with slideways or gibs $a'$ for this sliding head, and a rod, $a^2$, connects the head $f$ and the lever D. When the lever D is moved to lower the sickle-bar, the frame and the parts carried thereon are tilted forward, and the seat F and driver are moved backward, thus preserving the "balance" of the machine.

The finger-beam G is provided with an angle-iron, G', having its forward or grain edge tapered, as shown in Fig. 4, to which iron G' are bolted the guard-fingers $G^2$. The sickle-bar $G^3$ is made with an inclined flange, $g$, on its under side, the angle of inclination corresponding to the taper of the edge of the angle-iron G', so as to fit nicely in the slot formed between the angle-iron and the guard-fingers $G^2$. The sickle-bar $G^3$ should be of sufficient thickness to allow the sections $G^4$, which are riveted thereto, to be in shearing contact with the ledger-plates $g'$ in the guard-fingers. Clips $g^2$, secured to the angle-iron G', project over the sickle-bar and sections and prevent any upward movement thereof, while the angular slot and the flange of the sickle-bar, fitting therein, prevent any backward movement of the bar and sections and always keep the latter in proper position on the ledger-plates.

$a^3$ is a foot-rest secured to the sliding head $f$, so that the driver or operator will have a convenient foot-rest or brace for his feet when the seat is moved backward to counterbalance the machine when tilted.

I deem it of great importance to be able to utilize the weight of the grain-wheel when harvesting on inclined ground or a hillside, and by locking the dividing-board to the sliding plate E, I am enabled to accomplish this result.

What I claim, and desire to secure by Letters Patent, is—

1. In a grain-harvester, the combination, with a dividing-board provided with ratchet-teeth, of a plate having a bearing for the axle of the grain-wheel, movably secured to said dividing-board, and a spring-actuated pawl secured to said axle-bearing plate, operating to engage said ratchet-teeth, with a cable and an operating-lever, said cable passing under the main frame and being secured at one end to said lever and at the other end to said pawl, whereby the frame is normally supported by the cable, substantially as described.

2. The combination, with a dividing-board, C, provided with guides $c^2$, one of said guides being provided with ratchet-teeth, of a sliding plate, E, having a pawl thereon attached to engage said teeth, and having also a spring attached to actuate said pawl, and an operating-lever and a cable, said cable passing under the main frame and being secured at one end to said pawl and at the other end to said lever, whereby the frame is normally supported by the cable, substantially as specified.

MAURICE KANE.

Witnesses:
TAYLOR E. BROWN,
LEW E. CURTIS.